United States Patent [19]

Hof et al.

[11] 4,345,470
[45] Aug. 24, 1982

[54] ALL PLASTIC DISPOSABLE THERMOMETER

[75] Inventors: Craig R. Hof, Hopatcong; Roy A. Ulin, Jr., Wyckoff, both of N.J.; Robert B. Polak, Asheville, N.C.

[73] Assignee: Akzona Incorporated, Asheville, N.C.

[21] Appl. No.: 113,142

[22] Filed: Feb. 1, 1980

Related U.S. Application Data

[63] Continuation-in-part of Ser. No. 946,935, Sep. 28, 1978, Pat. No. 4,232,552, which is a continuation-in-part of Ser. No. 895,422, Apr. 13, 1978, abandoned, which is a continuation-in-part of Ser. No. 844,334, Oct. 21, 1977, abandoned, which is a continuation-in-part of Ser. No. 796,492, May 12, 1977, abandoned.

[51] Int. Cl.$^3$ ............................................. G01K 11/16
[52] U.S. Cl. .................................. 374/106; 252/408; 374/162
[58] Field of Search .................. 73/356, 358; 116/207, 116/217; 252/408

[56] References Cited

U.S. PATENT DOCUMENTS

| | | | |
|---|---|---|---|
| 3,175,401 | 3/1965 | Geldmacher | 73/356 X |
| 3,430,491 | 3/1969 | Gignilliat | 73/356 X |
| 3,440,882 | 4/1969 | Jones | 73/356 |
| 3,465,590 | 9/1969 | Kluth et al. | 73/356 |
| 3,521,489 | 7/1970 | Finkelstein et al. | 73/358 |
| 3,631,720 | 1/1972 | Weinstein et al. | 73/358 |
| 3,665,770 | 5/1972 | Sagi et al. . | |
| 3,677,088 | 7/1972 | Lang . | |
| 3,688,582 | 9/1972 | Gradishar | 73/371 |
| 3,704,985 | 5/1972 | Pickett et al. . | |
| 3,712,141 | 1/1973 | Chadha et al. | 73/356 |
| 3,826,141 | 7/1974 | Pickett et al. . | |
| 3,872,822 | 3/1975 | Ayres | 116/114.5 |
| 3,878,722 | 4/1975 | Crites | 73/356 |
| 3,915,004 | 10/1975 | Nollen et al. | 73/371 |
| 3,922,917 | 2/1975 | Ayres . | |
| 3,929,021 | 1/1976 | Pecorella . | |
| 3,946,611 | 3/1976 | Larsson | 73/356 |
| 3,946,612 | 3/1976 | Sagi et al. . | |
| 3,961,532 | 6/1976 | Kukuruzinski | 73/371 |
| 3,965,742 | 6/1976 | Parker | 76/356 |
| 3,974,317 | 8/1976 | Sharpless | 428/215 |
| 3,980,581 | 9/1976 | Godsey et al. . | |
| 3,981,683 | 9/1976 | Larsson | 23/253 |
| 3,998,098 | 12/1976 | Chilton | 73/356 |
| 4,128,007 | 5/1978 | Ulin . | |
| 4,140,016 | 2/1979 | Fergason | 73/356 |
| 4,150,572 | 4/1979 | Lindquist | 73/356 |
| 4,154,106 | 5/1979 | Inoue et al. . | |
| 4,189,942 | 2/1980 | Giezen et al. . | |
| 4,222,268 | 9/1980 | Greenberg et al. | 73/371 |
| 4,232,552 | 11/1980 | Hof et al. . | |
| 4,248,089 | 2/1981 | Heinmets | 73/356 |

FOREIGN PATENT DOCUMENTS

| | | |
|---|---|---|
| 54-69581 | 6/1979 | Japan . |
| 3640 | of 1898 | United Kingdom . |
| 551783 | 3/1943 | United Kingdom . |
| 904846 | 8/1962 | United Kingdom . |
| 1367703 | 9/1974 | United Kingdom . |

OTHER PUBLICATIONS

McAllister, *Septicaemia*, Scot. Med. J. 20, 85–91, (1975).
McAllister, *Lassa Fever*, The Lancet, pp. 376–377, (Feb. 15, 1975).
Dimond, et al., *Clinical Thermometers and Urinometers*, J.A.M.A., 156, No. 2, pp. 125–126 (Sep. 11, 1954).
Beck, *Oral Thermometry*, Guthrie Bulletin, 43, pp. 170–185, (Apr. 1974).
McAllister, *A Single-Use Clinical Thermometer*, Scot. Med. J., 20, pp. 301–304, (1975).
St. Cyr, et al., *A New Disposable Oral Thermometer in Clinical Use*, Guthrie Bulletin, 42, pp. 94–104, (Apr. 1973).

*Primary Examiner*—Kyle L. Howell
*Assistant Examiner*—Joseph W. Roskos
*Attorney, Agent, or Firm*—Robert H. Falk; Francis W. Young; Charles A. Wendel

[57] ABSTRACT

A new and useful all plastic disposable thermometer is disclosed, which dispenses with the prior art employment of an aluminum or other metal-based substrate. The novel thermometer can either be employed with opaque indicator means or with heat-sensitive compositions of matter that change color with a change in phase, such as those enumerated in copending application Ser. No. 946,935, filed Sept. 28, 1978, now U.S. Pat. No. 4,232,552.

26 Claims, 13 Drawing Figures

FIG. 1  PRIOR ART  THERMOMETER

KLUTH, ET. AL., THERMOMETER, SIDE VIEW

KLUTH, ET. AL., THERMOMETER, SECTION OF POCKET

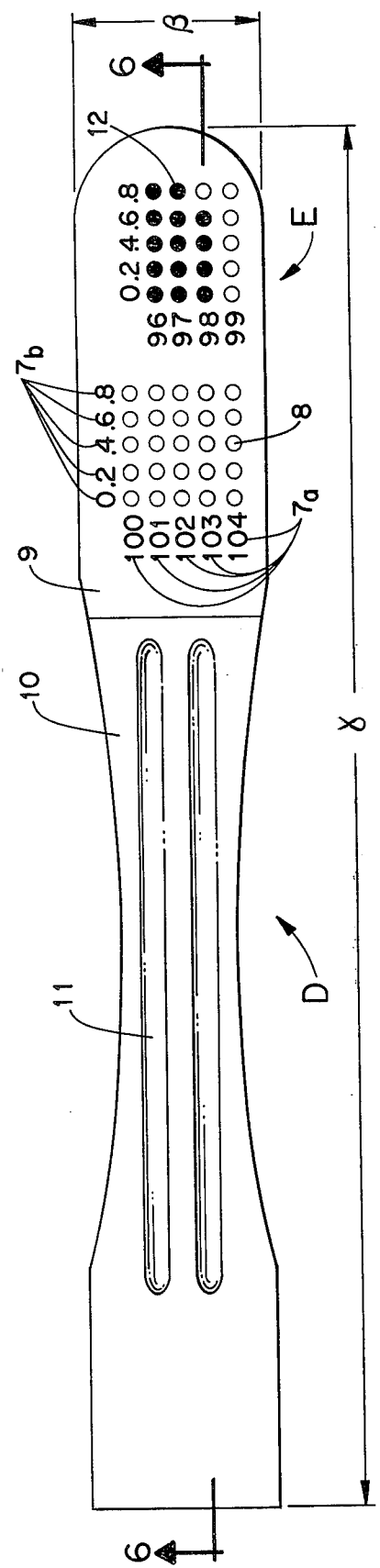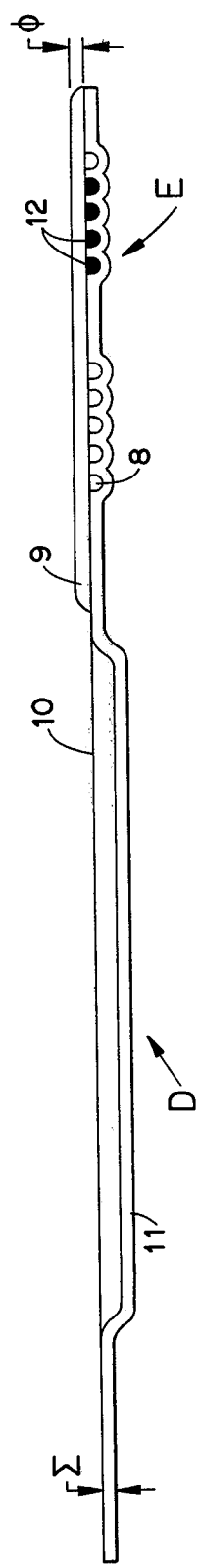
FIG. 5
FIG. 6

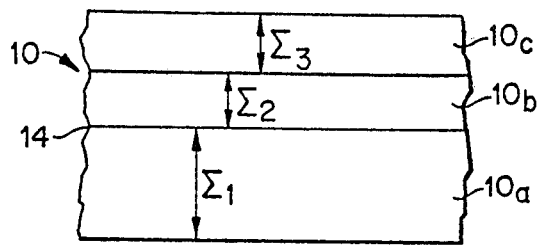
FIG. 7
EXAMPLE 1,
BOTTOM LAYER
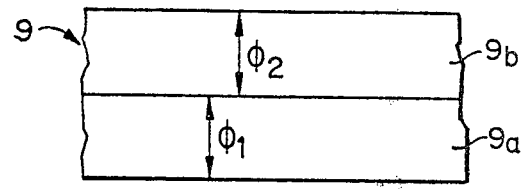
FIG. 8
EXAMPLE 1,
TOP LAYER
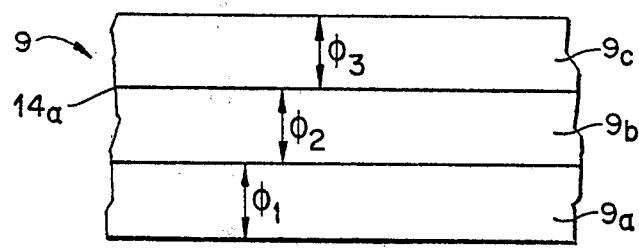
FIG. 9
EXAMPLE 1, TOP LAYER, ALTERNATE
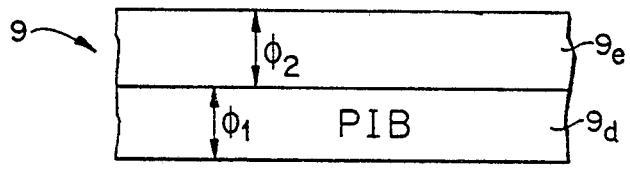
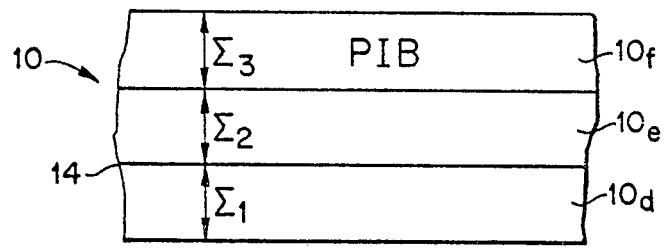
FIG. 10
EXAMPLE 2

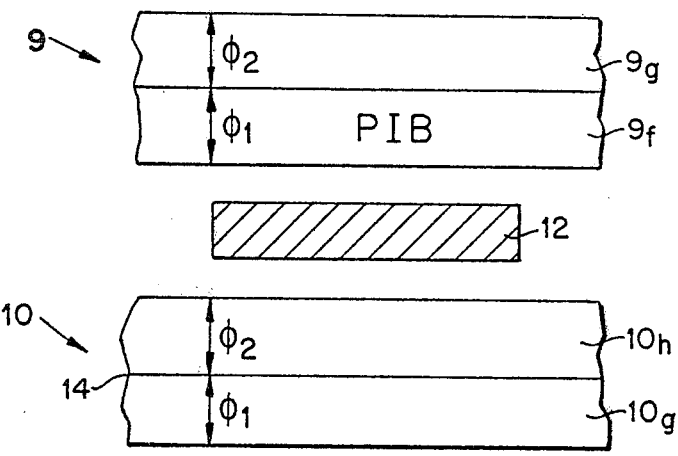
FIG. 11
EXAMPLE 3
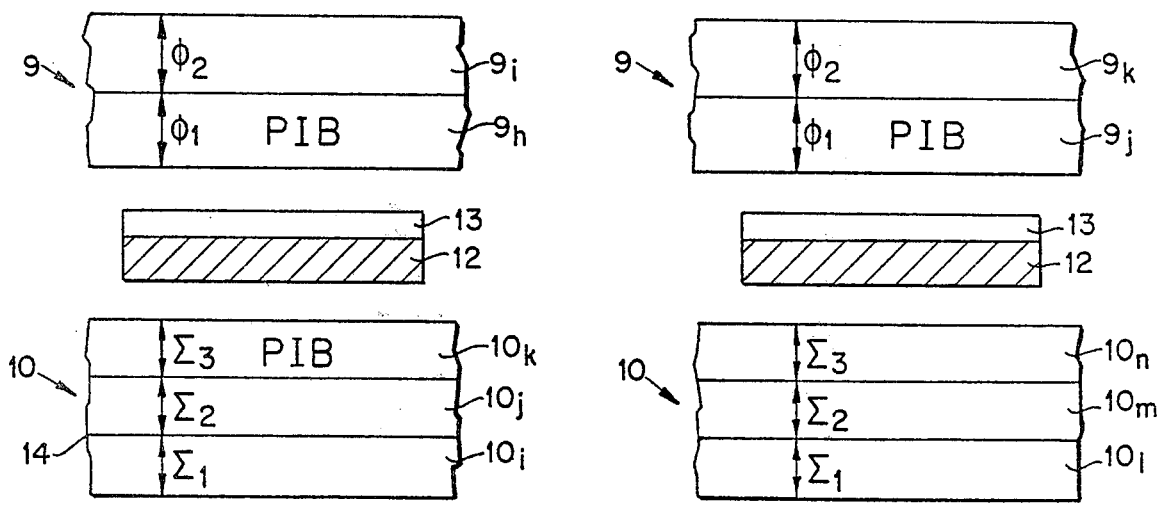
FIG. 12
EXAMPLE 4
FIG. 13
EXAMPLE 6

ALL PLASTIC DISPOSABLE THERMOMETER

RELATED APPLICATIONS AND PATENTS

This application is a continuation-in-part of United States Ser. No. 946,935, filed Sept. 28, 1978, now U.S. Pat. No. 4,232,552, entitled "TEMPERATURE INDICATING COMPOSITIONS OF MATTER", by Craig R. Hof and Roy A. Ulin, which is a continuation-in-part of United States Ser. No. 895,422, filed Apr. 13, 1978, now abandoned, which is a continuation-in-part to United States Ser. No. 844,334, filed Oct. 21, 1977, now abandoned, which is a continuation-in-part of United States Ser. No. 796,492, filed May 12, 1977, now abandoned. This application is related by subject matter to (1) United States Ser. No. 896,406, filed Jan. 16, 1978, now U.S. Pat. No. 4,128,007, entitled "SUPPORT MEMBER FOR A DISPOSABLE THERMOMETER" (issued Dec. 5, 1978), by Roy A. Ulin; (2) United States Ser. No. 896,114, filed on Apr. 13, 1978 now U.S. Pat. No. 4,189,942, entitled "TEMPERATURE INDICATING DEVICE USING A PRESSURE SENSITIVE ADHESIVE SEAL", by E. A. Giezen, G. D. B. van Houwelingen and M. Cramer, based upon Netherlands Application No. 7,704,765 (May 2, 1977); (3) United States Ser. No. 015,080, filed Feb. 26, 1979, entitled "PROTECTIVE PACKAGING FOR THERMOLABILE GOODS", by Craig R. Hof and Hasmukh Shah; and (4) Ser. No. 104,411, filed on Jan. 7, 1980, by Craig R. Hof, Roy A. Ulin and Concepcion Osio, entitled "IMPROVED DISPOSABLE REVERSIBLE THERMOMETER", all of (1)–(4) incorporated herein by reference. See also U.S. Pat. No. 4,154,107, incorporated herein.

BACKGROUND TO THE INVENTION

1. Field of the Invention

This invention relates to the field of disposable thermometry.

2. Description of the Prior Art

In an attempt to make an inexpensive accurate disposable clinical thermometer, those skilled in the art have relied on a metal—generally aluminum or alloys containing aluminum—to transfer energy quickly from the interior of the mouth to an area of the thermometer having various cavities, each containing a corresponding number of heat-sensitive composition of matter which revealed upon changing phase (i.e., melting) a marker beneath, or which were absorbed into another layer in the cavity to indicate that a particular temperature has been reached. While plastics were relatively inexpensive to metals, it was seen that a good heat conductive substrate was necessary to transfer sufficient energy to the cavity within a reasonable time—such as a minute or two—to "fire" or melt the proper number of compositions of matter. See, in particular, U.S. Pat. No. 3,980,581 to Godsey et al. (col. 3, lines 15–36), which recommends aluminum over copper, silver, gold, or stainless steel and the statement that "Naturally, the heat-sensitive carrier 11 must be a material which has a high thermal conductivity and relatively large surface area of contact with the test subject . . . ". Similar recommendations are given at col. 2, lines 36–57 of U.S. Pat. No. 3,704,985 to Pickett et al.; col. 2, lines 60–73 of U.S. Pat. No. 3,665,770; British Pat. No. 1,367,703 (package comprises using a layer of foil); col. 2, lines 38–43; col. 6, lines 24–30, and col. 7, line 55 to col. 8, line 29 of U.S. Pat. No. 4,154,106 to Inoue et al. (not admitted to be available prior art here); col. 3, line 64 et seq. of Sagi et al., U.S. Pat. No. 3,946,612. See also U.S. Pat. No. 3,826,141, U.S. Pat. No. 3,677,088 and U.S. Pat. No. 3,922,917.

Some literature and patents vaguely mention or suggest non-metal alternatives, but give no concrete indication or teaching as to the construction of an operable disposable non-metallic thermometer, e.g., British Pat. Specification No. 551,783 (means for using pressure sensitive adhesive tapes and a rubbery adhesive to form an envelope about a temperature-indicating portion of the device, but further considerations of rigidity, diecutting capability and capability with heat sensitive compositions are not made).

Some suggestion of using plastic to partially or completely surround the heat sensitive solvents has been made in various patents; e.g., British Pat. No. 904,846 (inter alia, p. 2, col. 1, lines 34–50, and p. 2, col. 2, line 68; see also p. 3, col. 1, line 30 and the Figure)—use of a plastic tube; British Pat. No. 3640 to Ramsden (which discloses the use of a base consisting of a piece of paper, celluloid, metal or other suitable material coated with or formed with a hollow or recess, containing a substance which is temperature sensitive). Most notably of these, we believe, are Kluth et al. U.S. Pat. No. 3,465,590, and Pecorella, U.S. Pat. No. 3,929,021.

Pecorella discloses the optional use of plastics, such as polyethylene "or a composite of plastic and metal" 10 (with the caveat of having good heat transfer characteristics), but also teaches the requirement of using vent strips 24 to an open end 18 of the thermometer; we think masking layers 14 and 16 would otherwise cause "blisters" by allowing air to gather before desired use of the thermometer), i.e., Pecorella attempts to try to make a thermometer which will store at any temperature and which will not register a temperature, e.g., "fire", until time of use.

Obviously, elimination of the masking layers 14 and 16 and venting areas 24 would each be a measurable advance in the art; two of present applicants have eliminated the need for masking layers in copending application Ser. No. 946,935, now U.S. Pat. No. 4,232,552 incorporated herein, and the instant invention eliminates the need for vents which are mechanically hard to manufacture and are, therefore, relatively costly.

The only non-metallic and plastic commercial prior art thermometer of any significance is Kluth et al., U.S. Pat. No. 3,465,590, shown in FIGS. 1–3. As shown in FIG. 1, the plastic thermometer is comprised of a temperature indicating portion C attached by neck B to a handle A. The temperature indicating portion C has a well 2 from which off-white wafers 4 protrude from a red-colored well 3 comprising substrate layer 5 and having a boundary with well 2. When a thermometer well is "fired", a number can be seen from the cavity. The red-colored well is better seen in FIG. 2. FIG. 3 shows a cut-away portion of a well with a substrate layer 5 and sealant layer 5a covering wafer 4 which comprises a fatty acid material 6.

Attention of the reader of Kluth et al. is specifically directed from col. 4, line 31 to col. 5, line 56, and also to FIG. 3 and col. 4, lines 64–68, which discloses enclosed pockets (as opposed to Pecorella) of "heat-sealable and workable, moisture-impervious, tough, inert, flexible, transparent plastic, such as unplasticized polyvinylchloride". Unfortunately, Kluth et al.'s rigid non-embossable PVC thermometer—a specimen of which is shown in FIGS. 1–3—must be molded and, therefore, cannot be manufactured by the modern web line operations (see copending application Ser. No. 946,935 and FIG. 10 and col. 6, line 15 to col. 8, line 34 of U.S. Pat. No. 4,154,107) as are known by those skilled in the art. The molded PVC or Kluth et al. thermometer did not, therefore, lend itself to being accurate, as only a few pockets 4, 5, 6 in '590 could be manufactured for a given thermometer and, therefore, only a few readings could be placed on the thermometer—usually at 2° or 3° F. intervals (see col. 7, line 71 et seq. and col. 9, lines 25–45, where Kluth et al. admits only a few pockets are possible).

Currently, disposable clinical thermometers on the market typically use an aluminum substrate layer (sometimes called in the alternative base layer or bottom layer) with embossed pockets covered by a sealant layer compromising a heat-activated or pressure-sensitive adhesive—coated plastic material. Prior to the instant invention, the use of an aluminum substrate was generally felt to be needed to allow the energy of the patient's mouth to reach quickly the thermally sensitive compounds, and the practical use of relatively poor heat conductive substrate lacking metal continuity in disposable thermometers was completely beyond the comprehension of those skilled in the art. Surprisingly, this construction, we have found, restricts the energy flow to the aluminum substrate and then allows the aluminum substrate to distribute and dissipate energy to other parts of the thermometer. The present state-of-the-art construction unfortunately also provides insulating pockets of air to exist in the thermometer matrix area, giving use to uneven heat transfer characteristics.

SUMMARY OF THE INVENTION

Surprisingly, it has been determined that by using only a relatively poor heat conductive plastic materials in the substrate layer, that energy transferred by the mouth to the thermometer is localized in the area of the thermally responsive chemicals and not distributed through the handle part of the thermometer outside the mouth, unlike aluminum. Because of this surprising phenomenon, the response time of an "all plastic" substrate-constructed thermometer is as fast as that of a thermometer having an aluminum substrate and covered with a plastic film. This allows plastic thermometers to be designed still with a relatively short response time. Specifically, the novel disposable thermometer device comprises:
- (a) suitable non-metallic polymeric heat-conducting embossable flexible base layer means having one or more spaced cavities defined therein to determine a like number of predetermined temperatures in a predetermined temperature range, with a like number of different thermally responsive compositions of matter in said cavities, each thermally responsive composition of matter associated with one of the predetermined temperatures; and
- (b) suitable non-metallic sealant layer means in sealing engagement with the base layer means, overlying each of said cavities;

to form a non-vented substantially vapor impermeable enclosure for each cavity between the base layer walls and floor of said cavity and the sealant layer means, and wherein at least one of the base layer means and the sealant layer means is transparent.

The novel disposable plastic thermometer has further advantages: first, the use of a plastic web also permits easier crushing of the pockets of the thermally responsive chemicals. This feature increases the contact area of the thermally responsive chemicals and plastic substrates to improve energy flow to the thermally responsive chemicals, which aids in reducing response time.

Second, disposable clinical thermometers made with aluminum substrates can develop sharp edges that can cause minor cuts to the patient's lips if the thermometer is misused, by extracting it while the mouth is closed. The novel plastic thermometer reduces this hazard.

Third, clinical thermometers having the novel plastic substrate avoid producing a circuit in the mouth causing shock, which occurs with aluminum substrates if metallic fillings exist in the cavities of the teeth (unless an insulator layer is used—which reduces, but may not eliminate possibility of shock).

Fourth, clinical thermometers produced with the aluminum substrate are inherently difficult to read because of the metallic gray background of the aluminum. The use of a novel and white non-metallic thermometer substrate presents a dramatic improvement in readability.

DESCRIPTION OF THE DRAWINGS

FIG. 5 depicts the novel disposable non-metallic thermometer from above;

FIG. 6 depicts by a horizontal view the same novel thermometer along lines 6—6 of FIG. 5;

FIG. 7 depicts by a cut-away view the substrate layer of Example 1;

FIG. 8 depicts by a cut-away view a sealant layer of Example 1;

FIG. 9 depicts by a cut-away view an alternate sealant layer of Example 1;

FIG. 10 depicts by a cut-away view sealant and substrate layers of Example 2;

FIG. 11 depicts by a cut-away view sealant and bottom layers of Example 3;

FIG. 12 depicts by a cut-away view sealant and bottom layers of Example 4; and

FIG. 13 depicts by a cut-away view sealant and bottom layers of Example 6.

DESCRIPTION OF THE PREFERRED EMBODIMENTS

Figure 1:
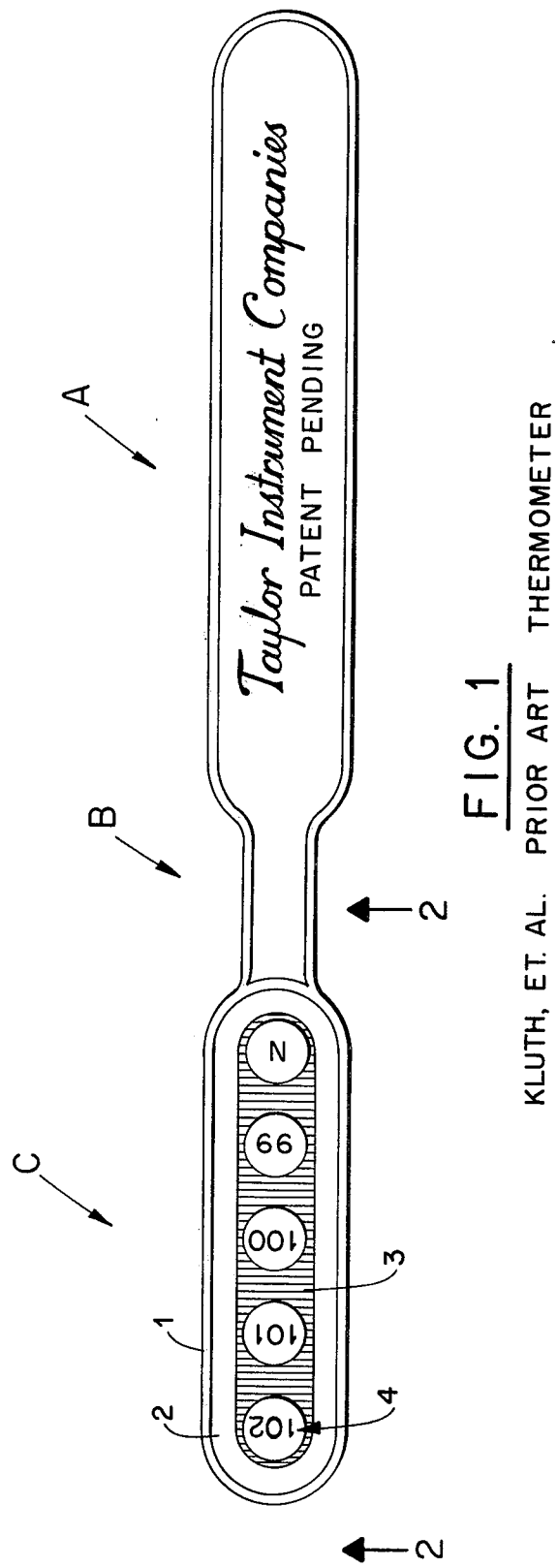
FIG. 1 depicts the Kluth et al. prior art thermometer disclosed above.
Figure 2:
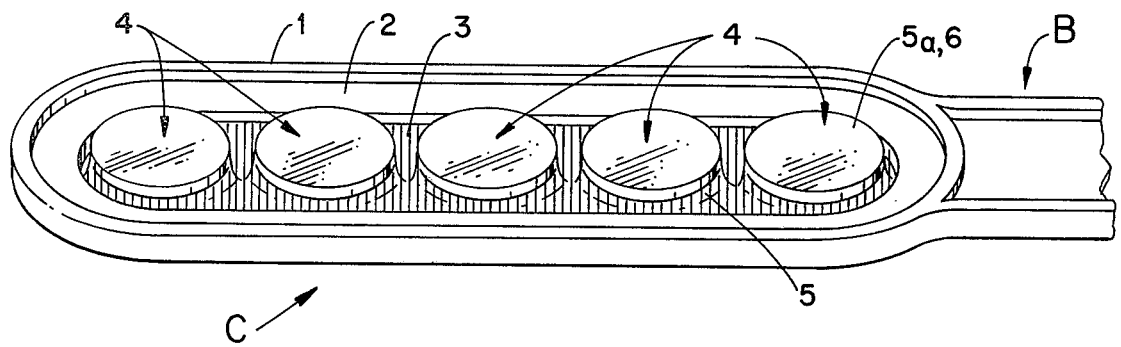
FIG. 2 depicts by a horizontal view the same Kluth et al. prior art thermometer along lines 2—2 of FIG. 1.
Figure 3:
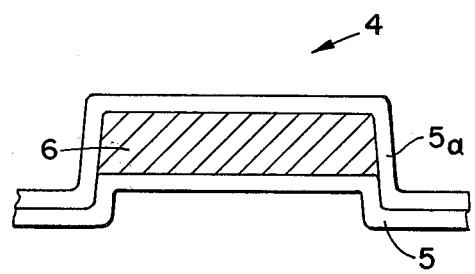
FIG. 3 depicts a cut-away view of a cavity of the Kluth et al. prior art thermometer.

A suitable non-metallic polymeric heat-conducting embossable flexible base layer means (which may be referred to hereinafter as a "suitable plastic substrate" or "suitable bottom layer", or the like), is comprised of one or more layers that meet the following requirements:
- (1) is easily embossable with pockets of about 0.030 to about 0.040 inch diameter and with a depth of from about 0.005 to about 0.025 inch;
- (2) is non-elastic after embossing so that pocket geometry is maintained;
- (3) is rigid to the extent that a thermometer of the substrate material which is of about 3.5 inches in length can be easily placed in the patient's oral cavity (embossing of longitudinal "ribs" is permitted to enhance this property and to reduce substrate thickness);

(4) is a vapor barrier to chemicals comprising the thermally responsive compositions of matter (for example, in a preferred embodiment where the novel temperature-indicating compositions of matter (NTICM) of U.S. Ser. No. 946,935 are employed, and in a particular test, where a combination of 0.035 weight percent pinacyanol iodide in a solvent comprising 25% by weight ortho-chloronitrobenzene (OCNB) and 75% by weight ortho-bromonitrobenzene (OBNB) is used, a barrier layer in the substrate which will not allow more than 0.3 $\mu$g of OBNB/OCNB solution to escape per day at 92° F. (33° C.));

(5) is not dissolved by the chemicals comprising the thermally responsive compositions of matter (for example, with the pinacyanol iodide-containing NTICM of the previous test example in part (4) comprising OCNB-OBNB, is not dissolved by the OCNB/OBNB solutions and not a solvent for the pinacyanol iodide), i.e., is "inert" to same;

(6) is either (a) heat sealable to the suitable nonmetallic sealant layer means (hereinafter which may be referred to simply as "sealant layer", or "cover layer", or "top layer", or the like) described hereinafter which covers the cavities, or (b) bondable by an adhesive system, such as a pressure-sensitive adhesive to a layer covering the pockets;

(7) has a tensile strength along the axis perpendicular to the longitudinal axis of the thermometer (i.e., along line 6—6 of FIG. 5) sufficient for conventional web line operation (we have found as a practical matter this requirement to be met by a tensile strength of at least 5,000 psig, and preferably at least 10,000 psig); because of the small size of the thermometer pockets, it is necessary to register accurately each thermometer at the respective work station as the web progresses along the machine (if there is excessive stretching and relaxing during the process of indexing the web through the machine, then suitable accurate registration will be impossible; also, if the substrate material becomes elongated as it is pulled through the machine, the thermometer will be distorted); and (8) is flexible, i.e., to the extent that it can be wrapped about a three or four inch diameter roller without breaking, cracking, acquiring wrinkles or a curved set, or without requiring a force of more than about four ounces (this requirement must be met as the substrate material is processed through loose loops and tensioning devices in the web manufacturing process and during the punching process).

By "embossable" in requirement (1), we mean capable of forming cylindrical pockets of the stated dimensions by suitable embossing means and processes known to those in the art, e.g., by non-interference fit male-female die tooling machines. By "polymers", we mean one or more natural or synthetic polymers known to those in the art, including but not limited to polyethylene, polypropylene, polystyrene, cellulose acetate, polyamide (e.g., Nylon 6), polytetrafluroethylene (such as that sold under the mark TEFLON®, by DuPont Company, Wilmington, Del.), polyurethane, etc. By "heat conducting", we mean a substance at 25° C. capable of coming to within 0.1° C. of ultimate equilibrium in less than about 1 minute when said substance is put in a water bath environment at 35° C. By a "non-metallic" material, we mean a material entirely non-metallic, or a material having metallic particles dispersed in a continuous non-metallic phase.

While some types of metals—such as aluminum—can meet all of the above requirements, no single plastic material is known to us that meets all of requirements 1 through 6(a) or 6(b) and 7-8; hence, a non-metallic thermometer substrate layer as is constructed herein will comprise a composite film having at least two sublayers. For example, Allied Chemicals Company's (Morristown, N.J.) PETRA® AW amorphous polyethylene terephthalate (amorphous "PET" or polyester) can meet requirements 1, 2, 3, and 6(b), but the solvent of a particular preferred NTICM of Ser. No. 946,935 (0.035 percent pinacyanol iodide in OCNB-OBNB) would dissolve in and permeate through the PETRA® AW layer. By combining a sublayer of DuPont's SURLYN® 1652 to the top surface of the PETRA® AW sublayer, either by extrusion or adhesive lamination, the composite could meet requirements 1, 2, 3, 5, 6, 7 and 8. However, since neither the PETRA® AW sublayer nor the SURLYN® 1652 sublayer is a sufficient vapor barrier at post-embossing thicknesses (which generally are less than 0.0015 inch), the composite doesn't have sufficient vapor barrier properties to meet requirement 4. A suitable vapor barrier for an OCNB-OBNB heat responsive solvent system is comprised of a sublayer Nylon 6 (for example, that marketed under the brand name CAPRAN® 77C, by Allied Chemical Co.), which has a chemical loss rating of 0.02 $\mu$g/cavity/day at 92° F. Therefore, a suitable composite can be made by adding a sublayer of Nylon 6.

A preferred mode for the plastic substrate is as follows: a sublayer of Pierson Industries' (Holliston, Mass.) composite of Nylon 6 (0.001 inch thickness) and SURLYN® 1652 (0.002 inch thickness) coextrudate is adhesively bonded to the top surface of a sublayer of PETRA® AW, which has a thickness of 0.006 inch, whereby the Nylon 6 sublayer is adjacent to the PETRA® AW sublayer. This composite is fed into a standard thermometer web line machine instead of the standard brushed aluminum foil. After embossing the substrate with thermometer pockets, a NTICM of 0.035 weight percent pinacyanol iodide in OCNB-OBNB is filled into the pockets. A sealant layer of the same Pierson Industries' Nylon 6/SURLYN® 1652 coextrudate is heat sealed on top of the pockets with the SURLYN® 1652 sublayers of substrate and cover layer together. Crushing of the pockets can be done by hard stamping of the thermometers between two rigid surfaces with or without heat or by passing the thermometers between hard rollers at high line pressures. See Example 1.

Another preferred all plastic thermometer can be made by replacing the PETRA® AW/Nylon 6/SURLYN®1652 substrate with a PETRA® AW/Nylon 6 substrate. The thermometers are processed through the normal embossing and filling operations known to those in the art. Sealing is done with a biaxially oriented crystalline polyester such as MYLAR® "type A" (DuPont) coated with a pressure sensitive polyisobutylene (PIB) adhesive tape. See Example 3. Heat sealing and pocket crushing are deleted operations.

Naturally, in composite substrates, each of the properties (1)-(8) are obtained from layers comprised of various components. In Example 1, the PETRA® AW sublayer may be replaced by other films which meet the "physical property" requirements 1, 2, 3, 6, 7 and 8, since the "barrier property" requirement 4 and the "chemical resistance property" 5 are met by the Nylon 6/SURLYN ® 1652 layers. Replacement of the PETRA ® AW sublayer by one or more sublayers of polypropylene, polystyrene, or the like could yield a cost savings depending on prevailing economic conditions.

The "barrier property" requirement 4 can vary depending upon the amount of thermal abuse to which the thermometers will be subjected. Polypropylene, for example, is not a sufficient barrier to OCNB/OBNB vapors to withstand exposure to temperatures of 110° F. (43° C.) for more than several hours. Hence, the shelf life of this polypropylene thermometer after this 110° F. level of thermal abuse will be compromised. On the other hand, polypropylene-substrated thermometers with a OCNB/OBNB solvent system can withstand sustained aging at 90° F. (32° C.) and are suitable for commercial sales where the expected thermal abuse will not exceed 90° F. for two weeks. An all plastic disposable thermometer can thus be constructed using a substrate comprising a non-laminated polypropylene sublayer and a pressure-sensitive adhesive sublayer, to bond to a thin polyester sealant layer, if proper precautions are made. See Ser. No. 015,080, incorporated herein.

A partial list of materials suitable for the substrate's "physical"/"chemical" sublayer to satisfy 1-3, 5, 6(a) or 6(b), 7-8, when combined with an OCNB/OBNB barrier sublayer satisfying requirement 4 is as follows:

(1) Cellulose acetate
(2) Polyamide (e.g., Nylon 6)
(3) Polyethylene terephthalate
(4) Polypropylene
(5) Polystyrene Other materials which do not meet the tensile strength (7) requirement but may be suitable subject to experimentation for compatibility with the manufacturing process are: ABS, polycarbonate, and high density polyethylene.

In most cases, the film used for the substrate (i.e., base or cavity) layer will be extruded and cast film rather than biaxially oriented film. Biaxially oriented film may not always be suitable due to its difficulty in embossing. Also, it is highly unlikely that film suppliers will be able to perform biaxial orientation on film to yield a thickness of at least 0.006 inch, which is preferred. Therefore, the preferred form of the resin film or sheet is that of a cast film. Further, if the base film or cavity layer is quenched after extrusion, it may even be more preferable to provide a polymer with amorphous or non-crystalline characteristics. For example, PETRA ® and PETRA ® AW are polyethylene terephthalate polymers which are quenched to an amorphous phase. This characteristic tends to yield a more easily embossable film.

The tensile strength requirement specified in No. 7 above as a minimum value of 10,000 psi may be higher than is required in the future, as the state of the art progresses. For example, through modifications of the web processing equipment, it would be possible for someone skilled in the art to utilize base or cavity layer materials with lower tensile strengths if the machinery were designed to handle that type of material. However, it is very doubtful at this time that, even through the use of moderately specialized equipment, a reasonable person would be successful in using polymers with tensile strengths of less than 5,000 psi.

In regard to "flexibility" requirement 8, it should be remembered that our current process calls for the material to be handled in the form of rolls of web stock. Also, after manufacture of the thermometer in web form, it is sometimes stored in the form of rolls of web prior to cutting. As such, it is even more desirable to use flexible materials which will not take a permanent curved set after being wound into a roll of web.

Again, the specified definition for a suitable plastic substrate means satisfaction of each of the requirements 1-5, 6(a) or 6(b), and 7 and 8 set forth above.

The sealant layer must meet requirements 4, 5, and 6(a) or 6(b).

When the substrate layer is opaque, then the sealant layer must be clear and transparent. However, the thermometer may be used in reverse, combining an opaque sealant layer with a clear substrate layer. Since the sealant layer generally will not be required to provide structural strength to the thermometer, it is usually preferred to minimize the thickness of the plastic film layer employed as the sealant layer, and to make it transparent.

It is also desirable to prevent the contents of the thermometer from being discharged into the patient's mouth, even during abuse, and, hence the sealant layer plastic film should contain a polymeric membrane which is relatively tough and puncture resistant, such as Nylon 6, or biaxially oriented polyester, e.g., MYLAR ® "type A".

Figure 4:
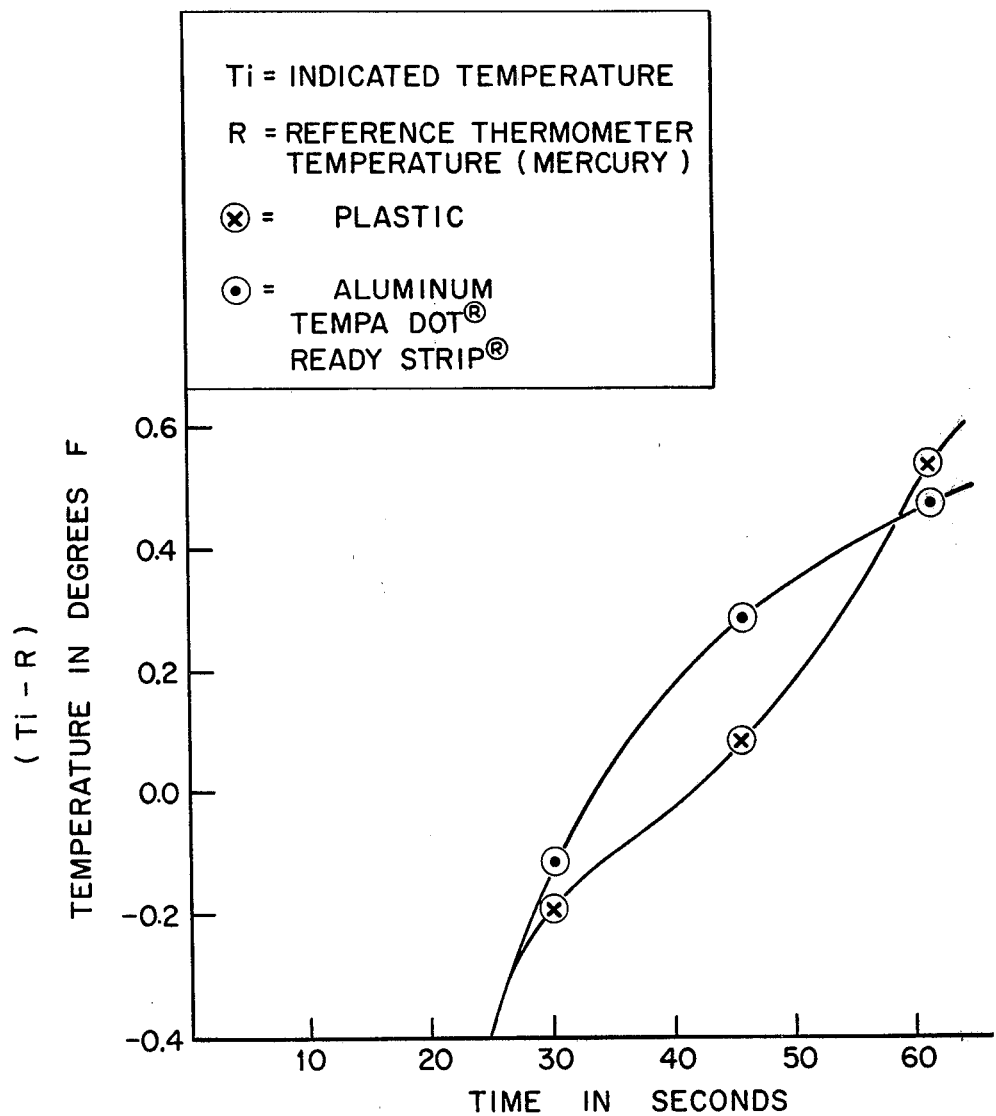
FIG. 4 shows graphically the results of comparative temperature-response testing between certain disposable thermometers having an aluminum-containing substrate and an all-plastic substrate.

FIG. 4 shows by graph the results of comparative temperature response testing between two types of disposable thermometers, the first having an aluminum substrate using NTICM of 0.035 weight percent pinacyanol iodide in OCNB/OBNB (now marketed as TEMPA-DOT ® READY STRIP ® by Organon Inc., West Orange, N.J.) and a corresponding thermometer of the same dimensions and same NTICM, but made entirely out of non-metallic components, and in the manner of Example 1. Specifically, the graph is a plot of:

(a) the respective differences between (1) the indicated temperatures of the TEMPA-DOT ® READY STRIP ® thermometer, and the corresponding plastic thermometer, and (2) a referee temperature (mercury) thermometer, respectively, versus (b) the insertion time in the patient's oral cavity. While it certainly must be accepted that plastic materials in general have a lower thermal conductivity than metallic substances, such as aluminum, the effect of the fact upon the performance of the thermometer is, surprisingly, not so straightforward. As can be seen in the attached graph, while the aluminum thermometer has an initially faster temperature response than the plastic thermometer, apparently the effect of heat loss through the handle portion of the thermometer to the handle portion, which extends outside the patient's mouth into a room temperature environment, causes the aluminum thermometer to require longer time to reach equilibrium temperature indication. Thus, after the initial difference in temperature indication due to thermal conductivity differences, the plastic thermometer surprisingly reaches a higher temperature indication than the aluminum thermometer, apparently since its non-conducting handle portion does not cool the matrix area of the thermometer. Moreover, the plastic thermometer overtakes the aluminum thermometer in less than about one minute, which is suitable for commercial sales of such thermometers.

At this point, we would also like to disclose another preferred embodiment for the novel plastic thermometer. This consists of a suitable substrate (base or cavity) layer upon which Nylon 6 sealant layer has been applied. The Nylon 6 layer may traverse the entire length of the substrate layer and be applied through conventional thermosetting adhesives (e.g., urethane) or it may be supplied as a narrow strip of nylon just long enough to cover the matrix area (see FIG. 5) and held in place with a suitable pressure sensitive adhesive, preferably acrylic. The thermometer pockets are embossed into the substrate layer, and preferably a NTICM of 0.035 weight percent pinacyanol iodide in OCNB/OBNB is filled into each pocket. The sealing layer is a pressure sensitive adhesive tape consisting of a 2 mil Nylon 6 film onto which has been applied a PIB adhesive. The PIB adhesive consists of a blend of OPPANOL® B-15, OPPANOL® B-50, and Chevron (San Francisco, Calif.) Polybutene No. 122. The respective ratio of these components is 1.5:0.5:3.0. See Example 3. The OPPANOL® components are supplied by BASF, D-6700 Ludwigshafen, Germany. The preferred embodiment may also use $CO_2$ blanket to cover the heat responsive chemicals in each pocket. This is an effective means for removing substantially all the residual air from inside the pocket after the covering layer of tape has been applied to the top. To do this, a stream of carbon dioxide is directed at the point where the top tape is laminated to the bottom web such that the pockets are substantially filled with carbon dioxide. Since the permeation rate of carbon dioxide is between 10 and 15 times that of nitrogen and oxygen, under existing pressure conditions, the carbon dioxide diffuses out of the pocket faster than the air or oxygen and nitrogen can diffuse in. The result is the creation of a partial vacuum inside which draws the adhesive and the top film down into the pocket. The result of this is a substantially full dot of color display. The $CO_2$ should be provided at about room temperature (25° C.), since if it is too cold, crystals of dry ice will form within the $CO_2$ gas lines and be deposited in the pockets and on the sealing surfaces of the thermometer. The $CO_2$ should be substantially pure and free of residues, such as oil. Impurities can affect the accuracy of the thermometer constituents. See Examples 4 and 6.

The operation of embossing the pockets into the plastic substrate must be performed with consideration given to the effects of said operation upon the chemical (e.g., HSTICM, if employed) retention shelf-life characteristics. This is particularly important when the substrate construction employs a thin (0.001–0.002 inch thick) layer of HSTICM barrier film such as Nylon 6.

In order to maintain the barrier properties, we have found that the film should not be stretched beyond the point where the thickness of the barrier film is less than about 0.0005 inch within the boundary of the pocket.

We have found that this aspect is affected by the following variables:

(1) the depth to which the pockets are embossed (as the depth increases, the thickness decreases after embossing);

(2) the pre-embossed thickness of the barrier film (as thickness increases, the thickness increases after embossing);

(3) the overall thickness of the substrate (as the thickness increases for a given thickness of barrier, the post embossed thickness decreases after embossing);

(4) the clearance between the emboss tool pin and the emboss tool die hole (as the clearance increases, the thickness increases after embossing);

(5) the alignment of the emboss pin to the center of the die hole (the closer the alignment, the thicker the barrier after embossing); and (6) the shape of the bottom of the emboss pin (the rounder the bottom of the pin, the thicker the barrier film after embossing).

One example of a particular system has substrate of 0.0065 inch PETRA® AW laminated 0.002 inch Nylon 6 as the vapor barrier. The following were employed in the manufacture:

(1) emboss depth: 0.007 inch;
(2) barrier thickness: 0.002 inch;
(3) overall thickness: 0.0085–0.0009 inch;
(4) clearance: 0.003 inch;
(5) alignment: center-to-center;
(6) 90° angle between flat pin bottom and sides.

In another example, we used a substrate of 0.0065 inch PETRA® AW laminated with 0.003 inch of Pierson Industries Nylon 6/SURLYN® 1652 coextrudate. The following were employed in the manufacture:

(1) emboss depth: 0.009 inch;
(2) barrier thickness: 0.001 inch;
(3) overall thickness: 0.0095 inch;
(4) clearance: 0.003 inch;
(5) alignment: center-to-center;
(6) curved bottom of pin and draft-tapered sides.

While no complete set of parameters can be developed for all substrates due to the complex interrelationship of the six variables listed above, the general relationships indicated will provide one skilled in the art with sufficient guidance to perform any desired embodiment of the invention without undue experimentation.

It is to be noted that the novel plastic thermometer of our invention can be used in at least two different manners: first, as an "opaque thermometer" by placing an opaque substance or numeral at the bottom of the cavity (which is displayed when a suitable solvent melts or "fires" at the temperature to be measured), or second, as a "HSTICM thermometer" using heat sensitive temperature indicating compositions of matter that turn color upon a change in phase. The latter alternative is preferred.

Preferably, a novel temperature-indicating composition of matter (NTICM) of Ser. No. 946,935 are employed as a HSTICM. Each NTICM composition exhibits a sharp color change upon transition from a liquid state to a solid state or from a solid state to a liquid state capable of being supercooled for at least several minutes, and is substantially free of impurities and consists essentially of:

(a) a solvent adapted to change from a solid state to a liquid state at substantially a predetermined temperature; and (b) an effective amount of one or more suitable organic moieties dissolved in and inert towards said solvent to form a solid solution when the composition is in the solid state, and adapted to change the color of the composition visible to the naked eye upon the change in state at substantially the predetermined temperature when so dissolved, and selected from one of the groups consisting of:
(1) one or more of a Group III body of compounds consisting of pinacyanol iodide, 1,1'-diethyl-2,2'-cyanine iodide, quinaldine red, pinacyanol chloride, thionin, methylene blue, cresol red, chlorophenol red, neutral red iodide, neutral red chloride, crystal violet, acridin orange, Orasol Orange RLN TM, Orasol Navy Blue TM, Irgalith Red PR TM, Fat Red BS TM, methyl violet, Xylene Cyanol FF TM, Rhodamine B TM, Rhodamine 6G TM, Irgalith Magneta TCB TM, Irgalith Pink TYNC TM, Toluidine Blue O TM, Savinyl Green B TM, Savinyl Blue RS TM, purpurin, 3,3'-diethylthiadicarbocyanine iodide, cryptocyanine, Dicyanine A TM, Merocyanine 540 TM, 4-(p-ethoxyphenylazo)-m-phenylene diamine monohydrochloride, Yellow Orange S TM, Chrysoidan G TM, fuchsin, aurintricarboxylic acid (ammonium salt), Victoria Blue R TM, Pyronin G TM, gallein, Erythrosin Yellow Blend TM, chlorophenol blue, bromophenol blue, bromocresol purple, Coriphosphine O TM, acriflavine, acridine orange, rhoduline violet, Alizarin cyanin 2R TM, Alizarin Red S TM, alcannin, Aurantia, Direct Green G TM, Fast Red Salt 3GL TM, Fast Blue Salt BB TM, Fast Garnet Salt GBC TM, Carta Yellow G 180 o/o TM, Murexide, Savinyl Blue GLS TM, Irgalith Blue GLSM TM, phthalocyanine, Di Amingreen B TM, Alizarin Blue S, Celliton Blue Extra TM, neocyanine, Janus Green TM, dimethyl yellow, Fast Yellow TM, methyl red sodium salt, Alizarin yellow R TM, Eriochrome black T TM, Chromotrope 2R TM, Ponceau 6R TM, Brilliant Ponceau G/R/2R, chromolan yellow, Sudan Red B TM, Bismarck brown G, Fat Black TM, Resorcin Brown TM, Benzofast pink 2BL TM, Oil Red EGN TM, Euroglaucine, Fuchsin NB TM, parafuchsin, Patent Blue TM, Irgalith Blue TNC TM, Phloxin B TM, fluorescein sodium salt, Rhodamine B base TM, Eosinscarlet, Eosin Yellowish TM, Erythrosin extra bluish, 4'5-dibromo fluorescein, ethyleosin, Phloxine TM, Cyanovin B TM, chlorocresol green, pinacyanol bromide, 2-(p-dimethylaminostyryl)-1-ethyl pyridinium iodide, ethyl red, iodide, nigrosine, Savinyl Blue B TM, Orasol Blue BLN TM, Safranin O TM, Azocarnun G TM, Phenosafranine TM, Azocarmine BX TM, Solophenyl Brilliant Blue BL TM, Nile Blue A TM, gallocyanine, gallamine blue, celestine blue, methylene green, Azure A/B/C TM, Blue VIF Organol TM, Alizarin, Nitrofast Green GSB TM, quinalizarine, Oil Blue N TM, Solvay purple, Ciba Blue TM, Indigo synthetic TM, Chromophtal Bordeaux RS TM, Acid Alizarin Red B TM, 5-aminofluorescein, Rose Bengal TM, Martius Yellow TM, Chicago Blue 6B TM, Alcian Blue 8GX TM, cresyl violet, 4,4'Bis(dimethylamino)benzylhydrol, Zinc phthalocyanine, Sudan III TM, Pyronin Y TM, Toluylene Blue TM, cresyl violet perchlorate, Mendola's Blue TM, Phosphine Dye TM, Nitron TM, cresyl violet acetate, Ceres Orange R TM, 4-phenylazo-1-naphtyl-amine, 4-(4-dimethylamino-1-naphthylazo)-3-methoxybenzene sulfonic acid, Bindschedler's Green TM, and p-(p-dimethylaminophenylazo)benzoic acid;
(2) a binary mixture of:
  (A) one or more of a Group I body of compounds soluble in said solvent consisting of the halogenated sulfonphthaleins and the organic acids having a $pK_1$ less than about four; and
  (B) one or more of a Group II body of compounds consisting of the aminotriphenylmethanes and their soluble salts, 8-hydroxyquinoline, and the cyanines;
  wherein the weight ratio of the Group I body of compounds to the Group II body of compounds is more than or about 3 to 1 and with the proviso that if the Group II compounds consist solely of one or more aminotriphenylmethanes or their soluble salts, then the Group I compound must be selected from one or more of the group consisting of oxalic acid, suitable soluble sulfonic acids, and the tetrahalogenated sulfonphthaleins, and the other organic acids having a $pK_1$ of less than or about 2, and
(3) one or more of the aforesaid Group III body of compounds with one or more of the Group I or Group II bodies of compounds.

Preferably, the Group I body of compounds are one or more of the group consisting of oxalic acid, bromophenol blue, bromothymol blue, chlorophenol red, bromochlorophenol blue, bromocresol green, 3,4,5,6-tetra-bromophenolsulfonphthalein, 2-naphthalenesulfonic acid, trichloroacetic acid, chloroanilic acid, bromophenol red, and chlorocresol green, and the Group II body of compounds are preferably one or more of the group consisting of 5(p-dimethylamino benzilidene)rhodanine ethyl red, crystal violet, pararosaniline, pararosaniline acetate, 3-ethyl-2-[5-(3-ethyl-2-benzothiazolinylidene)-1,3-pentadienyl]-benzothiazolium iodide, basic fuchsin, 8-hydroxyquinoline, ethyl violet, brilliant green, dicyanine A, pinacyanol chloride 2-(p-dimethylaminostyryl), 1-ethyl-pyridinium iodide, 3,3'-diethylthiodicarbocyanine iodide, and cryptocyanine. Most preferably, if a Group I compound is used, it is selected from the halogenated sulfonphthaleins having a $pK_1$ of about 2 and a $pK_2$ of about 7 to about 9. Regardless, the total amount of organic moieties of Groups I-II selected is from about 0.025 to about 0.05 percent of the total weight of the solvent and the soluble organic moieties. Preferably, the solvent is selected from one of more of the group consisting of ortho-chloronitrobenzene, ortho-bromonitrobenzene, 1-thymol, 2-napthol, 2-ethoxybenzamide and napthalene. If the human clinical temperature range is to be measured, the predetermined temperature is generally between 96° F. and 105° F., and the thermometer should be constructed to have pockets containing NTICM measuring temperatures at 0.2° F. intervals. This can be accomplished by having a solvent that is preferably a binary mixture of ortho-chloronitrobenzene and ortho-bromonitrobenzene having a proportion of ortho-chloronitrobenzene (OCNB) to ortho-bromonitrobenzene (OBNB) of about 43.8:56.2 to about 4.0:96.0. Most preferably, an OCNB-OBNB system is used with the organic Group III moiety pinacyanol iodide, ideally present in an amount of 0.035 weight percent of the entire OCNB-OBNB composition.

As an alternative to using $CO_2$ above to manufacture cavities, each having full dots of color display, each thermally responsive composition of matter comprises:

(a) a suitable heat-sensitive composition capable of changing color at a predetermined temperature;

(b) a suitable matrix-forming amorphous material; and (c) a suitable film-forming material that is more crystalline than said matrix-forming amorphous material. Most preferably, it will further comprise a solubilizing compound. A preferable matrix-forming amorphous material is polyisobutylene. A preferable film-forming material may be selected from the group consisting of paraffin wax and low molecular weight polyethylene. The solubilizing compound is preferably chosen from the alcohols having the formula $C_nH_{2n+1}OH$, wherein n is in the range of 18 to 24. An excellent alcohol is docosanol (below). These materials can be blended in with the NTICM in the manner described in Ser. No. 104,411, incorporated herein.

A most preferable composition of is that wherein: (a) the suitable heat-sensitive composition is substantially free of impurities and consists essentially of an effective NTICM composition containing an amount of pinacyanol iodide in a solvent consisting of ortho-chloronitrobenzene and ortho-bromonitrobenzene; (b) the suitable matrix-forming amorphous material is polyisobutylene; (c) the suitable film-forming material is HISTOWAX ® HX482 (Matheson, Coleman & Bell, Rutherford, N.J.); and (d) the suitable solubilizer is docosanol ($C_{22}H_{46}O$ by Fluka through Tridon Chemicals, Hauppauge, N.Y.), and weight ratio of and weight ratio of (a):(b):(c):(d) is approximately 48:26:5:21, respectfully. See Example 5.

Although the invention has been described with reference to specific embodiments above, numerous variations and modifications will become evident to those skilled in the art without departing from the scope and spirit of the invention described above, defined in the appended claims, and as shown in the following Examples:

EXAMPLE 1

A cut-away view from the horizontal of a substrate 10 (or "base layer") of one embodiment of our plastic thermometer is shown in FIG. 7. The substrate 10 is a composite of three sublayers: (1) lowermost PETRA ® AW amorphous polyethylene terephthalate 10a (amorphous polyester) from Allied Chemicals, Morristown, N.J., having a thickness $\Sigma_1$ of about 0.006 to 0.0065 inch; (2) Nylon 6 (preferably Allied chemical's CAPRON ® 77C) 10b having a thickness $\Sigma_2$ of about 0.001 inch; and (3) SURLYN ® 1652 ionomer resin 10c (E. I. duPont de Nemours & Company, Wilmington, Del.) having a thickness $\Sigma_3$ of about 0.002 inch. Layers 10b-10c can be a composite coextrusion bought from Pierson Industries (Holliston, Mass.) and are also materials commonly used in meat and dairy product packaging.

Referring briefly to FIGS. 5-6, one sees a grid of pockets in two sets, each identified by columns 7b marked "0.2", "0.4", "0.6" or "0.8", and by rows 7a marked by an integer from 96 to 104. Returning to FIG. 7, these numbers are first printed on a roll of PETRA ® AW polyester 10a. A roll of Pierson Industries composite 10b-10c is bonded to the PETRA ® AW polyester sublayer 10a by a common polyurethane adhesive 14 through a standard hot roll lamination method known to those in the art at 150° F.-170° F. (we have selected the adhesive DURO-FLEX ® 25 by National Adhesives Corporation, Bridgewater, N.J.). The tri-sublayered composite material is allowed to set and cure for about two weeks.

Next, the cured composite substrate layer 10 is put on a standard web-line filling machine (we use a modified Webb Line No. 2 by Bio-Medical Sciences, Inc., Fairfield, N.J., or an Info-Chem Web Line No. 2, Organon Inc., West Orange, N.J.) and after embossing the pockets is filled with a NTICM mixture of 0.035 weight percent in ortho-chloronitrobenzene:orthobromonitrobenzene (OCNB-OBNB) as described in copending Ser. No. 946,935. The web is then passed in the same machine over a cold plate at about −60° C. to about −70° C. to solidify the NTICM. Afterwards, another roll of Pierson Industry's composite layer, as shown in FIG. 8, of Nylon 6/SURLYN ® 1652 forms the top or sealant layer 9, with the Nylon 6 sublayer 9b having a thickness $\phi_2$ of 0.001 inch and the SURLYN ® 1652 sublayer 9a having a thickness $\phi_1$ of 0.002 inch, the sublayer 9a to be adjacent to the SURLYN ® 1652 substrate sublayer 10c upon heat sealing.

Heat sealing of the sealant layer 9 to the substrate layer 10 is performed at 350° F.-370° F. in the same machine for about 180 milliseconds. The sealant layer may cover the entire thermometer (including handle D in FIGS. 5-6), or preferably just the pocket area E of FIGS. 5-6, where the substrate layer 10 comprises the handle portion D.

After heat sealing, the web is sent to the next station in the same machine to emboss the handle stiffening ribs, if desired (see rib 11 in FIGS. 5-6). The finished thermometers are then die cut from the web and take their final appearance as shown in FIG. 5. They are placed in paper wrappers and put in boxes for sale.

As a preferred alternate for sealant layer 9, a biaxially oriented polyester sublayer of MYLAR ® "type A" (E. I. duPont de Nemours & Company) 9c can be bonded as shown in FIG. 9 by a polyurethane adhesive 14a such as the aforementioned DURO-FLEX ® 25. The MYLAR ® layer has a thickness $\phi_3$ of about 0.00048 inches. The Nylon 6 sublayer 9b retains the customary thickness $\phi_2$ of 0.001 inch bonded by Pierson Industries to the SURLYN ® 1652 sublayer 9a of 0.002 inch. The MYLAR ® layer acts as an aid to heat sealing where it prevents buildup of debris on the hot block heat-sealing head due to minor imperfections in the surface of the Nylon 6.

Referring again back to FIGS. 5-6, handle "E" has two sets of pockets 8 indicated by rows 7a of temperatures from 96 to 104 and by columns 7b of even tenths of temperatures from 0 to 0.8. If the NTICM of Ser. No. 946,935 is employed having pinacyanol iodide in OCNB-OBNB, a "fired" cavity will be blue 12 as opposed to its solid pink color. The layer 10 having a rib 11 protrudes and comprises the substrate layer 10. The substrate layer 10 has an overall thickness $\Sigma$ of no more than 0.010–0.015 inch, preferably about 0.008–0.0095 inch, while the sealing layer 9 has an overall thickness $\phi$ of about 0.003 to about 0.004 inches. The thermometer has an overall length of $\gamma$ about 3.5 inches.

EXAMPLE 2

In this Example, a different composite is employed for the substrate layer 10, as shown in FIG. 10. The bottom sublayer 10d is again PETRA ® AW amorphous polyester, having a thickness $\Sigma_1$ of 0.006 inch. The intermediate sublayer 10e is Nylon 6, (CAPRAN ® 77c), this time having a thickness $\Sigma_2$ of 0.002 inch. The top sublayer 10f is a polyisobutylene adhesive (PIB): we use the BASF (Ludwigshafen, Germany) brand OPPANOL ® B-150 of PIB. The upper layer has a thickness $\Sigma_3$ of about 0.0015 inch.

Again, one starts out by printing the rows 7a and columns 7b (see FIG. 5) on the PETRA ® AW sublayer 10d of FIG. 10. The PETRA ® AW sublayer 10d, is then bonded by a polyurethane adhesive 14 (DUROFLEX ® 25, as above) to Nylon 6 sublayer 10e. After a curing period of about 2 weeks, the PIB self-adhesive layer is applied to the 10e–10d composite by applying PIB to Nylon 6 in a bath with a solvent (e.g., mixed hexanes) through a metering block, removing the excess PIB solvent, and drying in hot air (120°–160° F.). In an alternate method, the PIB adhesive can be prepared on a release liner, and after drying can be laminated at room temperature under pressure (15 lbs/inch of laminating line) to the Nylon 6.

The cover layer 9 comprises a top sublayer 9e of Nylon 6 (CAPRON ® 77C) having a thickness $\phi_2$ of about 0.001 to about 0.002 inches, and a bottom sublayer 9d of the same PIB having a thickness $\phi_1$ again of 0.0015, applied to the Nylon 6 layer in the same manner.

After the substrate layer 10 is prepared, the usual steps are performed of embossing cavities, filling cavities with NTICM 12, freezing, laminating the upper layer (except without heat sealing), embossing the rib 11 (of FIGS. 5–6), cutting, and packaging. All except the last step may, again, be performed on the Webb No. 2 machine of Bio-Medical Sciences, or on the Webb No. 2 machine of Organon Inc., West Orange, N.J.

EXAMPLE 3

In FIG. 11, the composite layer 10 simply comprises a bottom sublayer of PETRA ® AW 10g having thickness $\phi_1$ of 0.006–0.0065 bonded to an upper sublayer 10h of Nylon 6 (CAPRAN ® 77c) having a thickness $\phi_2$ of 0.002 inches. The two layers may be bonded, as before, by a coating 14 of DURO-FLEX ® 25.

The cover layer 9 comprises a sublayer 9g of Nylon 6 (CAPRAN ® 77c) having a thickness $\phi_2$ of 0.002 inch, and a lower sublayer 9f of a specially blended PIB having a thickness $\phi_1$ of 0.0015 inch. The PIB blend consists of OPPANOL ® B 15:OPPANOL ® B-50: [Chevron's] polybutene No. 122 having a weight ratio of 1.5:0.5:3.0, respectively.

After the numbers in rows 7a and columns 7b (FIG. 5) of FIGS. 5–6 are printed on the PETRA ® AW substrate layer, the PETRA ® AW sublayer 10g is bonded 14 by DURO-FLEX ® 25 to Nylon 6 layer 10h. The substrate layer 10 is allowed to sit two weeks. The PIB part 9f of cover layer 9 (as with all PIB-coated layers) is covered by a release liner during storage. We prefer S2062 by H. P. Smith Co., a division of Phillips Petroleum, 5001 West Sixty-Sixth Street, Chicago, Ill.

The substrate layer 10, after curing, is then embossed with cavities, filled with NTICM 12, frozen, and then laminated to the cover layer 9. A rib (11 in FIGS. 5–6) is embossed in the handle portion D (FIG. 5), and the thermometer is cut and packaged in the usual way.

It must be noted that if Nylon 6 is the uppermost part of the cover layer, as in FIG. 11, and if it is submersed in the mouth or in hot water for extended periods of time, it may start curling around the edges, since Nylon 6 is water-sensitive. The Nylon 6 sublayer 9g in the upper layer 9 of FIG. 11 can be replaced by a biaxially-oriented crystalline polyester, such as the aforementioned MYLAR ® "type A". In the alternative, one can simply bond MYLAR ® "type A" sublayer to the top of the Nylon 6 sublayer 9g. As a third alternative, one can apply a layer of polypropylene adhesive tape to the top of the Nylon 6 layer (we recommend the tape J-LAR ® (grade "P-910"), by the Permacel Co., New Brunswick, N.J.).

EXAMPLE 4

In FIG. 12, substrate composite layer 9 consists of a bottom sublayer 10i of PETRA ® AW having a thickness $\Sigma_1$ of about 0.006–0.0065 inch, bonded to an intermediate sublayer 10j of Nylon 6 (CAPRAN ® 77c) having a thickness $\Sigma_2$ of 0.001–0.002 inch, bonded to an upper PIB sublayer 10k having a thickness $\Sigma_3$ of about 0.0015–0.002 inch. Here, the PIB can be composed of either OPPANOL ® B-150 or a 1:1 blend of OPPANOL ® B-15:OPPANOL ® B-100 is recommended.

The sealant layer 9 comprises a bottom sublayer 9j PIB (Again 1:1 of OPPANOL ® B-100: OPPANOL ® B-15 having a thickness $\phi_1$ of 0.0015 inch), bonded to an upper sublayer 9k of Nylon 6 (CAPRAN ® 77C) having a thickness $\phi_2$ of about 0.002.

Again, temperature-indicating criteria in rows of integers 7a and columns of even tenths 7b (FIG. 5) are printed on the PETRA ® AW sublayer 10i; the Nylon 6 sublayer 10j is bound to the PETRA ® AW by a polyurethane adhesive 14 (DURO-FLEX ® 25); after two-week curing, the PIB sublayer 10k is coated to the Nylon 6. The substrate layer 10 is embossed with pockets, filled with NTICM 12, and frozen in the usual manner. Just at point of lamination, however, carbon dioxide at room temperature is inserted between the substrate layer 10 and the sealant layer 9, so that the NTICM-containing pockets are substantially, if not totally, covered by a carbon dioxide layer 13. Since the permeation rate of carbon dioxide is between 10 and 15 times that of the air combination of nitrogen and oxygen, under existing pressure (152 Torr $O_2$, 608 Torr $N_2$) conditions upon sealing, the carbon dioxide diffuses out of the pocket faster than air or oxygen and nitrogen can diffuse in; the result is the creation of a partial vacuum inside which draws the adhesive and the top film down into the pocket, causing a full dot of color display, without problems in visibility of a "ring" in the NTICM due to surface tension.

EXAMPLE 5

Instead of employing a cover layer of $CO_2$ in Example 4, a special heat-sensitive composition is employed to render a full dot of cover display. As taught in copending application Ser. No. 104,411, the modified composition of matter comprises:
 (a) a NTICM comprising pinacyanol iodide in a solvent system of OCNB-OBNB as herebefore described;
 (b) a suitable matrix-forming amorphous material, e.g., isobutylene;
 (c) a suitable film-forming material, e.g., HISTOWAX ® HX482 (Matheson, Coleman & Bell, Rutherford, N.J.); and
 (d) a suitable solubilizer, e.g., docosanol ($C_{22}H_{46}O$ by Fluka, Catalogue 43960).

The ratio of (a):(b):(c):(d) is approximately 48:26:5:21. The modified composition is filled in the pockets in the normal manner.

EXAMPLE 6

In FIG. 13, our most preferred embodiment, substrate layer 10 comprises a bottom sublayer 101 of PETRA ® AW (having a thickness $\Sigma_1$ of 0.006-0.0065), adjacent to an intermediate pressure-sensitive acrylic adhesive sublayer 10m (AROSET ™ 1085 Z-45 by Ashland Chemicals, Columbus, Ohio) having a thickness $\Sigma_2$ of 0.0005-0.001 inch. The adhesive is adjacent to a Nylon 6 top sublayer 10n having a thickness $\Sigma_3$ of 0.002 inch.

The sealing layer 9 has the same Nylon 6 upper sublayer 9k with the same thickness $\phi_2$ of 0.002 inch as Example 3; the bottom sublayer 9j is the same PIB blend as Example 3 with the same thickness $\phi_1$ of 0.0015 inch.

As usual, the temperature numbers 7a, 7b are printed on the PETRA ® AW sublayer 101. The acrylic adhesive 10m is first placed on the Nylon 6 sublayer 10n by a standard coating (may be performed by Gravure Flex, 100 Wesley Street, South Hackensack, N.J. 07606). Composite layers 10n-10m are bonded to the PETRA ® AW sublayer 101 by the pressure sensitive adhesive 10m. The substrate layer 10 is embossed with the cavities, filled with the NTICM of Examples 1-4, and frozen in the normal manner. Afterwards, the substrate layer 10 and the sealant layer 9 are laminated with $CO_2$ injected at the point of lamination, and a rib 11 (FIGS. 5-6) embossed in the handle portion "D" (FIGS. 5-6) composed of the extended substrate layer. The thermometers are then cut in the normal fashion.

EXAMPLE 7

In a preferred alternate to Example 6, layer 10n may be made of a 2-layer composite, such as nylon/-polyethylene or nylon/SURLYN ®. The two layers may be adhesively bonded by a typical urethane adhesive (DURO-FLEX ™ 25) or they may be coextrusions such as Pierson Industries' Nylon 6/SURLYN ® 1652 coextrusion.

Again referring to FIG. 13, substrate layer 10 comprises a bottom layer 101 of PETRA ® AW (having a thickness $\Sigma_1$ of 0.006-0.0065 inch), adjacent to an intermediate pressure sensitive adhesive sublayer 10m having a thickness $\Sigma_2$ of 0.0005-0.001 inch. The adhesive is adjacent to the Nylon 6 sublayer of 10n having a thickness $\Sigma_3$ of 0.001-0.002 inch. The polyethylene or SURLYN ® sublayer of 10n has a thickness of 0.001 inch to 0.002 inch. The polyethylene or SURLYN ® layer constitutes the uppermost surface of substrate layer 10.

The sealing layer 9 has an upper substrate layer 9k consisting of biaxially oriented polyester (Mylar ® type A, DuPont, Wilmington, Del.) with a thickness $\phi_2$ of 0.001 inch. The bottom sublayer 9j is a PIB blend with thickness $\phi_1$ of 0.0015 inch. The PIB blend consists of OPPANOL ™ B-15:OPPANOL ™ B-50: Amoco's INDOPOL ™ (polybutene) H-1900 having a weight ratio of 1.5:0.5:3.0, respectively.

As usual, the temperature numbers 7a, 7b are printed on the PETRA ® AW sublayer 101. The pressure sensitive adhesive layer 10m is first applied to the Nylon 6 surface of sublayer 10n by standard coating method. Composite layers 10n-10m are bonded to the PETRA ® AW sublayer 101 by the pressure sensitive adhesive layer 10m using standard lamination technique taking care to avoid the inclusion of air pockets between layers 10m and 101. The substrate layer is embossed with the cavities, filled with the NTICM and frozen in a normal manner. Afterwards, the substrate layer 10 and the sealant layer are laminated with $CO_2$ injected at the point of combination such that the free volume of each pocket is substantially filled with $CO_2$. Rib 11 (FIGS. 5-6) are embossed in the handle portion "D" (FIGS. 5-6) composed of the extended substrate layer 101. In this fashion, the composite layers 10n-10m are applied only to that portion of substrate 101 which bears the printed temperature numbers 7a and 7b. The thermometers are then cut in the normal fashion.

We claim:

1. A disposable thermometer device comprising:
   (a) suitable non-metallic polymeric heat-conducting easily embossable flexible base layer means having one or more spaced cavities defined therein of about 0.030 to about 0.040 inch diameter and with a depth of from about 0.005 to about 0.025 inch, said cavities being non-elastic, to determine a like number of predetermined temperatures in a predetermined temperature range, with a like number of different thermally responsive compositions of matter associated with one of the predetermined temperatures, said compositions being inert to said base layer means; and
   (b) suitable non-metallic sealant layer means in sealing engagement with the base layer means, overlying each of said cavities, the compositions of part (a) being inert to said sealant layer means;

to form a rigid non-vented substantially vapor-impermeable enclosure for each cavity between the base layer walls and floor of said cavity and the sealant layer means, wherein at least one of the base layer means and the sealant layer means is transparent and has a tensile strength sufficient for conventional web-line operation.

2. The device of claim 1, wherein opaque indicator means are located at the bottom of each cavity.

3. The device of claim 1, wherein each thermally responsive composition of matter is a suitable heat-sensitive composition which changes colors at the predetermined temperature.

4. A disposable thermometer device, comprising:
   (a) suitable non-metallic polymeric heat-conducting embossible flexible base layer means having one or more spaced cavities defined therein to determine a like number of predetermined temperatures in a predetermined temperature range, with a like number of different thermally responsive compositions of matter in said cavities, each thermally responsive composition of matter associated with one of the predetermined temperatures and being a suitable heat-sensitive composition which changes colors at the predetermined temperature; and
   (b) suitable non-metallic sealant layer means in sealing engagement with the base layer means, overlying each of said cavities;

to form a non-vented substantially vapor-impermeable enclosure for each cavity between the base layer walls and floor of said cavity and the sealant layer means, wherein at least one of the base layer means and the sealant layer means is transparent, and wherein said heat-sensitive composition exhibits a sharp color change upon transition from a liquid state to a solid state or from a solid state to a liquid state capable of being supercooled for at least several minutes and is substantially free of impurities and consists essentially of:
   (1) a solvent adapted to change from a solid state to a liquid state at substantially a predetermined temperature; and (2) an effective amount of one or more suitable organic moieties dissolving in and inert towards said solvent to form a solid solution when the composition is in the solid state, and adapted to change the color of the composition visible to the naked eye upon the change in state at substantially the predetermined temperature when so dissolved, and selected from one of the groups consisting of:

(A) one or more of a Group III body of compounds consisting of pinacyanol iodide, 1,1'-diethyl-2,2'-cyanine iodide, quinaldine red iodide, pinacyanol chloride, thionin, methylene blue, cresol red, chlorophenol red, neutral red iodide, crystal violet, acridin orange, Orasol Orange RLN TM, Orasol Navy Blue TM, Irgalith Red PR TM, Fat Red BS TM, Xylene Cyanol FF TM, Rhodamine B TM, Rhodamine 6G TM, Irgalith Magneta TCB TM, Irgalith pink TYNC TM, Toluidine Blue O TM, Savinyl Green B TM, Savinyl Blue RS TM, purpurin, 3,3'-diethylthiadicarbocyanine iodide, cryptocyanine, Dicyanine A TM, Merocyanine 540 TM, 4-(p-ethoxyphenylazo)-m-phenylene diamine monohydrochloride, Yellow Orange S TM, Chrysoidan G TM, fuchsin, aurintricarboxylic acid (ammonium salt), Victoria Blue R TM, Pyronin G TM, gallein, Erythrosin Yellow Blend TM, chlorophenol blue, bromophenol blue, bromocresol purple, Coriphosphine O TM, acriflavine, acridine orange, rhoduline violet, Alizarin Cyanine 2R TM, Alizarin Red S TM, alcannin, Aurantia, Direct Green G TM, Fast Red Salt 3GL TM, Fast Blue Salt BB TM, Fast Garnet Salt GBC TM, Carta Yellow G 180 o/o TM, Savinyl Blue GLS TM, Irgalith Blue GLSM TM, phthalocyanine, Di Amingreen B TM, Alizarin Blue S TM, Celliton Blue Extra TM, neocyanine, Janus Green TM, dimethyl yellow, Fast Yellow TM, methyl red sodium salt, Alizarin yellow R TM, Eriochrome black T TM, Chromotrope 2R TM, Ponceau 6R TM, Brilliant Ponceau G/R/2R, chromolan yellow, Sudan Red B TM, Bismarck Brown G TM, Fat Black TM, Resorcin Brown TM, Benzofast pink 2BL TM, Oil Red EGN TM, Euroglaucine, Fuchsin NB TM, parafuchsin, Patent Blue TM, Irgalith Blue TNC TM, Phloxine B TM, fluorescein sodium salt, Rhodamine B base TM, Eosin Scarlet, Eosin Yellowish TM, Erythrosin extra bluish, 4'5-dibromo fluorescein, ethyleosin, Phloxine TM, Cyanovin B TM, chlorocresol green, pinacyanol bromide 2-(p-dimethylaminostyryl)-1-ethyl pyridinium iodide, ethyl red, nigrosine, Savinyl Blue B TM, Orasol Blue BLN TM, Safranin O TM, Azocarnun G TM, Phenosafranine, Azocarmine BX TM, Solophenyl Brilliant Blue BL TM, Nile Blue A TM, gallocyanine, gallamine blue, celestine blue, methylene green, Azure A/B/C TM, Blue VIF Organol TM, Alizarin, Nitrofast Green GSB TM, quinalizarine, Oil Blue N TM, Solvay purple, Ciba Blue TM, Indigo synthetic TM, Chromophthal Bordeaux RS TM, Acid Alizarin Red B TM, 5-Aminofluorescein, Rose Bengal TM, Martius Yellow TM, Chicago Blue 6B TM, Alcian Blue 8GX TM, cresyl violet, 4,4'Bis(dimethylamino)-benzylhydrol, Zinc Phthalocyanine, Sudan III TM, Pyronin Y TM, Toluylene Blue TM, cresyl violet perchlorate, Mendola's Blue TM, Phosphine Dye TM, Nitron TM, cresyl violet acetate, Ceres Orange R TM, 4-phenylazo-1-naphthylamine, 4-(4-dimethylamino-1-naptylazo)-3-methoxybenzene sulfonic acid, Bindschedler's Green TM, and p-(p-dimethylaminophenylazo)-benzoic acid;

(B) a binary mixture of:
(A) one or more of a Group I body of compounds soluble in said solvent consisting of the halogenated sulfonphthaleins and the organic acids having a $pK_1$ less than about four; and
(B) one or more of a Group II body of compounds consisting of the aminotriphenylmethanes and their soluble salts, 8-hydroxyquinoline, and the cyanines;

wherein the weight ratio of the Group I body of compounds to the Group II body of compounds is more than or about 3 to 1 and with the proviso that if the Group II compounds consist solely of one or more aminotriphenylmethanes or their soluble salts, then the Group I compound must be selected from one or more of the group consisting of oxalic acid, suitable soluble sulfonic acids, and the tetrahalogenated sulfonphthaleins, and the other organic acids having a $pK_1$ of less than or about 2, and (C) one or more of the aforesaid Group III body of compounds with one or more of the Group I or Group II bodies of compounds.

5. The device of claim 4, wherein (a) the Group I body of compounds are one or more of the group consisting of oxalic acid, bromophenol blue, bromothymol blue, chlorophenol red, bromochlorophenol blue, bromocresol green, 3,4,5,6-tetra-bromophenol-sulfonphthalein, 2-naphthalene-sulfonic acid, trichloroacetic acid, chloroanilic acid, bromophenol red, and chlorocresol green, and (b) the Group II body of compounds are one or more of the group consisting of 5-(p-dimethylamino benzilidene)rhodanine, ethyl red, crystal violet, pararosaniline, pararosaniline acetate, 3-ethyl-2-[5-(3-ethyl-2-benzothiazolinylidene)-1,3-pentadienyl]-benzothiazolium iodide, basic fuchsin, 8-hydroxyquinoline, ethyl violet, brilliant green, dicyanine A, pinacyanol chloride, 2-(p-dimethylaminostyryl)-1-ethyl-pyridinium iodide, 3,3'-diethylthiodicarbocyanine iodide, and cryptocyanine.

6. The device of claim 4, wherein the weight percentage of organic moieties soluble in the solvent is from about 0.025 to about 0.05% of the weight of the solvent and said soluble organic moieties.

7. The device of claim 4, wherein the predetermined temperature is from about 96° F. to about 105° F.

8. The composition of matter of claim 4, wherein the solvent is selected from one or more of the group consisting of ortho-chloronitrobenzene, ortho-bromonitrobenzene, 1-thymol, 2-naphthol, 2-ethoxybenzamide, and naphthalene.

9. The device of claim 4, wherein the solvent is a binary mixture of ortho-chloronitrobenzene and ortho-bromonitrobenzene having a proportion of ortho-chloronitrobenzene to orthobromonitrobenzene of about 43.8:56.2 to about 4.0:96.0.

10. The device of claim 4, wherein the Group I compounds consist of the halogenated sulfonphthaleins having a $pK_1$ of about 2 and a $pK_2$ of about 7 to about 9.

11. The device of claim 6, wherein the organic moiety is pinocyanol iodide and the solvent is a mixture of orthochloronitrobenzene and ortho-bromonitrobenzene.

12. The device of claim 11, wherein the pinacyanol iodide is present in an amount of 0.035 weight percent of the entire composition.

13. The device of claim 4, wherein the sealant layer means is transparent, and the base layer means comprises a composite film of (a) a PETRA ® AW sublayer and (b) SURLYN ® 1652 sublayer bonded to a Nylon 6 sublayer wherein the SURLYN ® 1652 sublayer is in sealing engagement with the sealant means, and the Nylon 6 sublayer is in sealing engagement with the PETRA ® AW sublayer.

14. The device of claim 13, wherein the SURLYN ® 1652 sublayer is of about 0.002 inch thickness, the Nylon 6 sublayer is about 0.001 inch thickness, and the PETRA sublayer has a thickness of from about 0.006 to about 0.0065 inch.

15. The device of claim 4, wherein the sealant layer means is transparent and comprises a composite of a Nylon 6 sublayer coated with a sublayer of a suitable composition comprising pressure sensitive polyisobutylene, wherein the polyisobutylene-containing sublayer is in vacuum sealing engagement with the base layer means.

16. The device of claim 15, wherein the Nylon 6 sublayer is of about 0.002 inch thickness and the polyisobutylene sublayer has a thickness of about 0.0015 inch.

17. The device of claim 4, wherein the sealant layer means is transparent, and the base layer means comprises a composite film of (a) a PETRA ® AW sublayer, and (b) a Nylon 6 sublayer, wherein the PETRA ® AW and nylon sublayers are in sealing engagement.

18. The device of claim 4, wherein the heat-sensitive composition in the cavity of the base layer means is under a carbon dioxide blanket.

19. The device of claim 4, wherein each thermally responsive composition of matter comprises:
(a) a suitable heat-sensitive composition capable of changing color at a predetermined temperature;
(b) a suitable matrix-forming amorphous material; and
(c) a suitable film-forming material that is more crystalline than said matrix-forming amorphous material.

20. The device of claim 19, further comprising a solubilizing compound.

21. The device of claim 19, wherein said matrix-forming amorphous material is selected from the group consisting of polyisobutylene.

22. The device of claim 19, wherein said film-forming material is selected from the group consisting of paraffin wax, low molecular weight polyethylene.

23. The device of claim 20, wherein said solubilizing compound has the formula $C_nH_{2n+1}OH$, wherein n is in the range of 18 to 24.

24. The device of claim 20, wherein said solubilizing compound is docosanol.

25. The device of claim 19, wherein said heat-sensitive composition consists essentially of pinacyanol iodide and a mixture of ortho-chloronitrobenzene and ortho-bromonitrobenzene.

26. The device of claim 20, wherein (a) the suitable heat-sensitive composition is substantially free of impurities and consists essentially of an effective amount of pinacyanol iodide in a solvent consisting of ortho-chloronitrobenzene and ortho-bromonitrobenzene; (b) the suitable matrix-forming amorphous material is polyisobutylene; (c) the suitable film-forming material is HISTOWAX ® HX482; and (d) the suitable solubilizer is docosanol, and weight ratio of (a):(b):(c):(d) is approximately 48:26:5:21.

* * * * *